United States Patent
Bertin et al.

(10) Patent No.: US 8,719,904 B2
(45) Date of Patent: May 6, 2014

(54) METHOD AND SYSTEM FOR USER ACCESS TO AT LEAST ONE SERVICE OFFERED BY AT LEAST ONE OTHER USER

(75) Inventors: Emmanuel Bertin, Luc-sur-Mer (FR); Jean-Pierre Deschrevel, Putot-en-Bessin (FR); Katell Henry, Brest (FR)

(73) Assignee: Orange, Paris (FR)

( * ) Notice: Subject to any disclaimer, the term of this patent is extended or adjusted under 35 U.S.C. 154(b) by 81 days.

(21) Appl. No.: 12/994,530

(22) PCT Filed: May 19, 2009

(86) PCT No.: PCT/FR2009/050934
§ 371 (c)(1),
(2), (4) Date: Nov. 24, 2010

(87) PCT Pub. No.: WO2009/153477
PCT Pub. Date: Dec. 23, 2009

(65) Prior Publication Data
US 2011/0072496 A1 Mar. 24, 2011

(30) Foreign Application Priority Data
May 27, 2008 (FR) ...................................... 08 53442

(51) Int. Cl.
*G06F 7/04* (2006.01)
(52) U.S. Cl.
USPC .......... 726/4; 726/5; 726/27; 726/28; 726/29; 726/30; 713/185

(58) Field of Classification Search
None
See application file for complete search history.

(56) References Cited

U.S. PATENT DOCUMENTS

2002/0120757 A1* 8/2002 Sutherland et al. ........... 709/229

FOREIGN PATENT DOCUMENTS

| EP | 1 758 365 A2 | 2/2007 |
| WO | WO 2005/045594 A2 | 5/2005 |

OTHER PUBLICATIONS

Wason et al., "Liberty ID-FF Architecture Overview (Version: 1.2-errata-v1.0)," Liberty Alliance Project, pp. 1-44 (Sep. 1, 2004).

* cited by examiner

*Primary Examiner* — Kaveh Abrishamkar
(74) *Attorney, Agent, or Firm* — Drinker Biddle & Reath LLP

(57) ABSTRACT

A method of access by at least one second user, to at least one service offered by a first user is provided, which includes transmitting by the first user to the second user at least one invitation comprising an access level defined by the first user to allow said at least one second user to access said at least one service; verifying the content of said at least one invitation, delivering to the second user an access authorization to said at least one service, dependent on the access level; and requesting access to said at least one service by the second user, on the basis of the access authorization.

12 Claims, 1 Drawing Sheet

METHOD AND SYSTEM FOR USER ACCESS TO AT LEAST ONE SERVICE OFFERED BY AT LEAST ONE OTHER USER

CROSS-REFERENCE TO RELATED PATENT APPLICATIONS

This application is the U.S. national phase of the International Patent Application No. PCT/FR2009/050934 filed May 19, 2009, which claims the benefit of French Application No. 08 53442 filed May 27, 2008, the entire content of which is incorporated herein by reference.

BACKGROUND

The present invention relates to the field of the sharing of services between several users, especially and not exclusively, in a context of services accessible through a communication network, some of these services possibly, for example, relying on the principles of the community web, or else pertaining to a context of interpersonal communications.

Various embodiments of the invention are aimed at introducing management of right of access of a user A to personal services (for example telephonic, presence) configured by a user B, linked with a user interface of web type.

Indeed, increasingly, telecommunication services are being designed with a view to community sharing and use of personalized information during interpersonal communications, or more generally still, with a view to mediation between a user and third parties.

By way of illustrative example, a photo service is no longer aimed solely at storing a user's photos, but also at allowing him to share them with others.

Likewise, a location service is no longer aimed solely at indicating to a user his location, but also at providing it to third parties.

The same holds for presence management services.

Older services such as telephony also enter into this framework: a telephone service allows third parties to contact a user.

In all these services, there is a requirement for control by the user who will render accessible to other users services that he has previously configured and/or personalized.

In the field of STN telephony, access to the telephone service is in principle public: anybody can access the telephone numbers referenced in a directory.

In the field of mobile telephony, there is a restriction of access by the dissemination of the mobile telephone number: the user can choose, either to publish his number in a directory so as to render it accessible to anybody, or to transmit it solely to the people that he authorizes to contact him by this means, via his mobile telephone.

As regards presence or location services, use is made of nominative authorization of the people who can access the presence or the location of a user of the service, these people being characterized by one of their personal identifiers with the presence/location service.

Other services, for example of the "social networking" type, combine a directory where it is possible to seek friends (for example according to one of their identifiers (often the name or forename), or via the membership of a network, or via centers of interest) and thus initially to access their public profile, and then request nominative authorization to access the private profile.

However, in all the aforementioned services, it is the service itself which manages the access authorizations.

Moreover, as regards communication services (telephony, presence, etc.), the existing solutions for managing access to services are based on a centralizing knowledge of the parties involved in the services.

A user expresses rights of access to his data and configures his services on the basis of the knowledge that he has or that he can obtain of his correspondents, for example on the basis of a contactability identifier, for example, a telephone number.

The history of the interactions between users is also involved in this knowledge base. An agreement may be established between users on their inclusion in lists of friends. Some interactions may have occurred in the past.

These data are also currently used to determine access rights.

In the services for sharing personal data (for example photos), known prior art solutions use the sending of invitations containing an access link, but these solutions are specific to each service. Allotting rights of access to N services therefore requires the sending of N invitations via N different interfaces, and which will be received and managed in N different ways by the receiver.

The earlier techniques exhibit principally all the following limitations:
- the user must have an understanding of the various systems that he will be able to use to set up his access rights;
- he must also know the contactability identifiers of his correspondents in order to adapt his systems as a function of these data;
- it is not possible to set up access controls if the contactability identifiers of his correspondents are not known a priori.

Various embodiments of the invention provide a novel solution which does not exhibit all these drawbacks of the prior art, in the form of a method of access by at least one second user, to at least one service offered by a first user.

SUMMARY

An embodiment of such a method comprises:
- a step of transmission by the first user to the second user, of at least one invitation comprising an access level defined by the first user so as to allow the second user to access at least one service;
- a step of verifying the content of said at least one invitation, delivering to the second user an access authorization to at least one service, dependent on the access level;
- a step of requesting access to at least one service by the second user, on the basis of the access authorization.

Various embodiments of the invention therefore propose a mutualized method of access of at least one second user to services placed at his disposal by a first user, this method taking account of access rights previously defined by the first user for the second user in an invitation transmitted to the latter and inviting him to access said services.

Advantageously, this makes it possible to circumvent the a priori knowledge of the environment and the correspondents of a service, by relying on the use of invitation coupons produced by the user and transmitted by the latter to his various correspondents (either known and/or not known) to allow them to access the data or the services that he wants to share in a more or less restrictive way.

Access to at least one service is understood to mean equally well access to application services managed by a first user, or access to personal data placed at the disposal of, or at the very least rendered accessible to, other users, on invitation, by this first user.

Furthermore, a second user is be able to transmit an invitation on the basis of another invitation that he has received previously from a first user. The following scenario is given by way of simple illustrative and nonlimiting example of a typical case such as this:

- a user A publishes a public invitation;
- the user B encounters a user A;
- B uses the public invitation of A to add him to his address book or more generally to his contacts;
- B sends a specific invitation to A (with the right for the latter to contact B) using the data contained in the public invitation of A;
- A receives the invitation specific to the user B and adds B to his contacts;
- A sends a new specific invitation to the user B (with the right for the latter to contact A) on the basis of the data and right of access contained in the invitation received from B.

A typical case such as this assumes of course that an invitation contains at least one item of information representative of its sender, for example an electronic mail address, or else any other type of communication identifier making it possible to get in contact with the latter.

Moreover, among the information contained in an invitation, it is possible to add at least one information field reserved for the addition of a personalized message of a sender user for the attention of a recipient user, of the type "we met the day before yesterday during . . . ".

Moreover, while a user is accessing an invitation, provision may be made in a possible variant implementation of the method according to the invention, for an authentication step intended to verify that the user of the invitation is not a robot machine. During such an authentication step, a user wishing to access and/or to use an invitation of another user will possibly have previously had to enter a text generated in a random manner.

Preferably, the method comprises prior to the transmission step, a step of generating by a device for managing invitations at least one invitation to access said at least one service intended for at least one second user.

A user wanting to deliver to some of his correspondents or contacts specific rights of access to his own shared data or services will advantageously be able to do so by generating a plurality of invitations destined for all or some of his correspondents or contacts, or indeed even to people for whom he possesses only a communication identifier or else an identification datum (electronic mail address, mobile telephone number for sending an SMS, bar code available on an electronic visiting card or on a web site, etc.), and then by sending his invitations to his various correspondents or contacts.

The definition of the access rights of at least one second user to a service shared by a first user is therefore carried out by the first user and no longer, as in the known prior art systems, by the service itself.

In an advantageous embodiment of the invention, the method also comprises a step of saving by the device for managing invitations said at least one invitation generated in relation to at least one second user.

Such saving allows the first user to return to each invitation that he has generated, with the objective of a subsequent modification of the latter intended to extend or restrict the access rights defined therein for a given correspondent or contact, or indeed to revoke it. An invitation may moreover have a limited lifetime, for example two weeks, after which it is no longer valid.

Advantageously, the generating step comprises for each invitation generated:

- a sub-step of validation by a certifying entity connected to said invitation management device, of an access level defined in the invitation so as to allow the second user to access said at least one service;
- a sub-step of storing by the certifying entity of at least one item of information representative of the second user and associated with at least one item of information representative of a validated access level so as to allow the second user to access said service.

Such a certifying entity will be able to take the form, by way of illustrative and nonlimiting example, of a privileges server able to manage a set of rights of access and/or of use of application services.

Such an approach according to the invention thus makes it possible to guarantee the extent of the rights of access delivered by a user supplying a service to another user and to store the access rights defined by this first user for the second user, with a view to a subsequent request for authorization of access therefrom with such a certifying entity.

In a particular embodiment of the invention, during the abovementioned generating step, a personal identifier specific to the second user is associated with the generated invitation.

Such an approach makes it possible subsequently to ensure that a second user who requests access to the service offered by a first user is indeed the one which corresponds to the personal identifier contained in the invitation, complementarily to said rights of access. This makes it possible therefore to avoid any attempt at identity spoofing and consequently at dishonest allocating of the content of an invitation.

An invitation can also include an identifier (coded) making it possible to respond to an invitation by an invitation (for example, via the invitation manager that identifies sender and receiver).

An invitation can also include a text or multimedia message of a first user intended for a second user.

In an advantageous embodiment of the invention, the abovementioned transmission step is executed by the device for managing invitations, while taking account of at least one communication identifier specific to the second user.

The invitation management device will indeed be able to take charge of sending the invitations to each of the correspondents/contacts previously specified by the user wanting to share at least one of his services, for example, via electronic mail, transmission of a message of the SMS, MMS type, etc.

It is also possible to envisage that the invitation management device is directly connected to a directory of contacts, or else to an address book specific to the first user who makes his service or services available, so as to determine the personal and/or communication identifiers of said correspondents/contacts, and to automatically transmit to each contact contained in the directory an invitation, as soon as the latter has been generated.

In a preferred embodiment of the invention, such an invitation is transmitted to the second user inside a predetermined data structure.

For example, an invitation may be directly integrated into a visiting card specific to the first user and attached to an electronic mail transmitted by the latter for the attention of a second user.

Such an invitation will be able, especially and in a nonlimiting manner, to take a "electronic" form (for example such as an SMS, MMS message, electronic mail, URL pointing to a web site or page, vcard, etc.), or else an electronic or concrete visual form (for example a paper card or an electronic card bearing a two-dimensional (2D) bar code).

Any other type of standardized data structure may be used as medium for transmitting an invitation.

In an enhanced embodiment of the invention, the verification step comprises a prior sub-step of authenticating the second user.

Such an approach according to the invention makes it possible to ensure with a greater level of control that a second user seeking to access a service of a first user is indeed the one to whom the first user has transmitted the invitation.

It is therefore up to the certifying entity, which can take the form of a privileges server, that participated in the generation of an invitation intended for a particular user, to validate access to the service. This validation will then be performed by comparing the data representative of rights of access contained in said service access authorization, with the stored data corresponding to said step of generating by said certifying entity.

Preferably, the method according to an embodiment of the invention comprises a step of checking the validity of the authorization of access by said at least one service with said certifying entity.

In an advantageous embodiment of the invention, in the abovementioned transmission step, the invitation is transmitted by a first invitations management device specific to the first user to a second invitations management device specific to the second user.

Thus, each user has his own management device, which will be able to manage the receipt of invitations to services, as well as the generation and the transmission of such invitations to other users.

By extension, the method according to the invention furthermore allows a user who has generated an invitation to subsequently modify it, or indeed even to revoke it for one or more users of this invitation.

A technical approach such as this turns out to be all the more beneficial as it allows the users to more easily manage the receipt and the sending of invitations to services, for example directly in conjunction with a directory of contacts, or else with their own address books, the invitations being able for example to be stored directly inside them, respectively.

Advantageously, on request of modification of a previously transmitted invitation, a step of transmission by the first device for managing invitations to the second device for managing invitations, of an update message for the previously transmitted invitation, so as to modify rights of access previously defined in this invitation by the first user for the second user.

This offers the additional advantage of allowing a first user to modify automatically and in complete transparency for a second user, rights of access to a service which have been initially defined by the first user for the second user, either to increase them, or to restrict them, or even to revoke them entirely.

Thus, it will suffice for a first user to request from his invitation management device, the updating of an invitation previously transmitted to a device for managing invitations specific to a second user, so that an update message is transmitted automatically to the latter device by the first device, so as to update the rights of access initially contained in the invitation concerned.

Various embodiments of the invention also relate to a system for access by at least one second user, to at least one service offered by a first user.

Accordingly, such a system comprises:
 a transmitter for transmission by the first user to the second user, of at least one invitation to access said at least one service, the invitation comprising an access level specific to said at least one service, the access level being defined by the first user for the second user;
 a verifier for verifying the content of said at least one invitation, able to deliver to the second user an authorization to access said at least one service taking account of the access level;
 a requestor for requesting access to said at least one service by the second user, the requestor taking account of the access authorization.

Preferably, such a system comprises at least one device for generating invitations which is able to collaborate with at least one entity for certifying rights of access (for example a privileges server), so as to generate at least one invitation to access said at least one service intended for at least one second user.

A non-transitory computer program product is also provided that may be downloadable from a communication network and/or stored on an information medium readable by computer and/or executable by a microprocessor, such a computer program product comprising code instructions for the execution of a method of access by at least one second user, to at least one service offered by a first user, in accordance with the aforementioned method.

BRIEF DESCRIPTION OF THE DRAWINGS

The technical characteristics and advantages of various embodiments of the present invention will emerge better from the following description, given by way of nonlimiting indication, with regard to the appended drawings in which.

DETAILED DESCRIPTION

Figure 1:
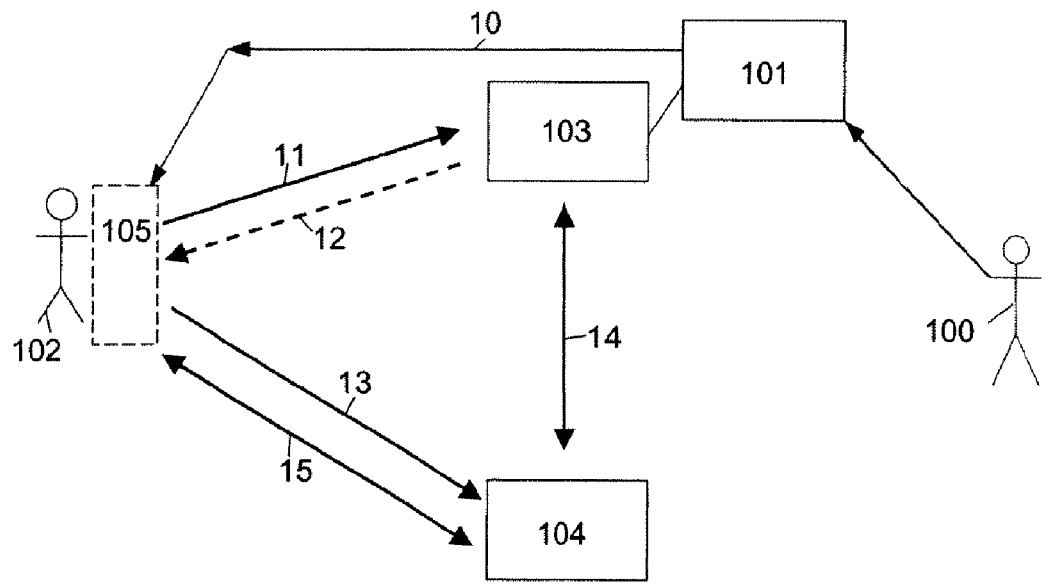
FIG. 1 presents an architecture of an embodiment of the system, as well as the dynamics of the information exchanged in such a system, in accordance with the method according to and embodiment of the invention.

As illustrated in FIG. 1, the principle according to various embodiments of the invention relies on the following sequence:
 first of all, the user 100 produces, on the basis of a device 101 for managing invitations, an invitation coupon. The invitation coupon affords access to data or service(s) of the user 100;
 the user 100 thereafter transmits (10) this coupon to at least one of his correspondents 102. This transmission (10) may be done for example by sending an electronic mail (email) or in the form of a multimedia message of instantaneous messaging type, or else in the form of an SMS message (for "Short Message Service"). The transmission 10 of the invitation coupons may be ensured in a dynamic and/or automatic manner by the device 101 for managing invitations. Such an invitation will preferably include an identifier specific to each recipient correspondent, for example a mobile telephone or "OpenID" account number, or else the number of an account in an address book, so that only the recipient possessing this identifier can use the invitation.

The transmission of the invitation coupons may also be done, in an advantageous variant embodiment of the invention, between a first invitations management device 101 specific to the first user 100 and a second invitations management device 105 specific to the second user 102. Such a variant makes it possible to simplify the transactions of invitations between users. It furthermore makes it possible to facilitate the updates of the access rights contained in previously transmitted invitations, by simply sending messages for updating rights of access between the invitations management devices 101 and 105.

subsequently, the correspondents 102 are then able to invoke (11) access to the data or services of the user 100 by producing the invitation coupon that they have previously received. This can be performed, in an optional manner, after a step of authentication with the guarantor of the identifier included in the invitation, for example with a privileges server 103 connected to the device 101 for managing invitations, the server 103 having been able to contribute to the generation of the invitation coupons;

the privileges server 103 decides an access control policy as a function of the invitation coupon, and returns (12) an access authorization coupon with which the correspondent can access (13) the service 104;

the service 104 accessed by the correspondent 102, then recovers (14) from the privileges server 103, on the basis of the authorization coupon transmitted by the correspondent 102, the rights of access to the service 104 which are authorized for the correspondent 102;

More generally, the privileges server (certifying entity) and the service(s) 104 interact (14) to determine the access rights of the second user. This interaction can be done either during access (of the service 104 to the privileges server 103), or else beforehand by a configuration of the service 104 by the privileges server 103, or indeed even indirectly by a shared secret (case of encryption);

the correspondent 102 uses (15) the service 104 placed at his disposal by way of an invitation transmitted by the user 100, according to the rights of access which were previously assigned to him by said user 100 in said invitation.

To ensure the dynamics of the exchanges within the framework of the access method according to an embodiment of the invention, a distributed system for access by at least one second user, to at least one service offered by a first user, is implemented. It relies on an implementation of the following various entities:

an invitation coupons management device 101: such a server device consists of a graphical interface (MMI) able to collaborate with an invitation coupons generating module, which are adapted for allowing a user 100 to generate, modify, revoke invitations, as well as the access rights contained therein, access rights defined by the user 100 so as to render at least one of his services 104 accessible to at least one correspondent 102. Such a device 101 for managing the invitation coupons may advantageously be linked to an address book of the user 100, so as to automate, or at the very least facilitate, the dissemination of the invitation coupons to the various correspondents 102 referenced in such an address book, and to facilitate the storage of the invitations received by the correspondents 102.

In a possible embodiment of the invention, it is conceivable, without additional difficulty in terms of implementation, for it to be possible for the invitations to be stored directly in an address book of a user.

Such a device 101 for managing the invitation coupons will be able, in an enhanced embodiment of the invention, to dynamically ensure the transmission 10 of the various invitation coupons intended for correspondents 102 targeted by the user 100. The various information that the coupons management device 101 produces during the step of generating the invitation coupons (namely, the invitation coupons themselves, the groups of correspondents and the associated rights) are stored in a privileges server 103 to which the device 101 is connected. According to the envisaged embodiment of the access system according to the invention, the privileges server 103 may be either integrated into the device 101 for managing the invitation coupons, or distinct and remote from the latter, while being connected to it, for example by way of a communication network.

A privileges server 103, able to collaborate with the device 101 for managing the invitation coupons. Such a server 103 generates unique identifiers of privileges associated with policies for managing access rights respectively defined by the user 100 for each of the correspondents 102 to whom he wants to transmit an invitation coupon to access at least one of his services 104.

The privileges server 103 constitutes a significant component of the system. It stores the link between an invitation coupon and the associated rights in relation to the services 104, defined by the user 100 for a given correspondent 102. It also stores, in an enhanced embodiment of the invention, a link between an invitation coupon and one or more identifiers of a correspondent 102 that are recipients of this coupon. It can update the abovementioned identifiers, for example when updating the contact record of the recipient in the address book of the sender 100 of the coupon, or at the request of a privileges server of another service supplier. When a request is made to it on the basis of an invitation coupon, the privileges server 103 responds, as a function of the rights associated with this coupon, by returning (12) to the correspondent 102 one or more access authorization tokens to access the authorized services.

In a possible embodiment of the invention, the system implements a device 105 for managing invitations specific to the second user 102: such a server device also consists of a graphical interface (MMI) adapted for allowing the second user to manage the various invitations that he may receive from various users, if appropriate, in conjunction with his address book.

Ultimately, a service 104 is accessed by a correspondent 102, as a function of access rights defined specifically for this correspondent 102 by a user-supplier 100 of the service 104, which access rights are validated and certified by the privileges server 103. The correspondent 102 then accesses the service 104 by transmitting (13) to the service 104, in his request for access thereto, a token which thus allows the service 104 to ascertain on the basis of this token the access control policy to be applied. Accordingly, the service 104 itself interrogates (14) the privileges server 103 so as to obtain in return therefrom the validation of the access rights invoked by the correspondent 102 to access the service 104.

The method of access by at least one second user, to at least one service offered by a first user, implements the following sequence:

The user 100 uses the MMI (Man-Machine Interface) of the device 101 for managing invitations, to generate invitation coupons or modify/delete existing invitations. He will previously have advised the services 104 to which he wants to afford access to at least one of his correspondents or contacts 102, and optionally created groups of right (family, professional, etc.) to be assigned to the invitations. To this end, the device 101 for managing invitations may be linked to the address book of the user 100 so as to be able to allocate rights to categories already created in his address book or to specific contacts.

By way of example, a user (100) can create the following groups:
- A "Family" group which can see the personal data of the user (100) concerned (such as name, forename, postal address, photo), his presence, contact him on his fixed or portable telephone and send him emails at his private or professional address
- A "Football club" group which can see the presence of the user concerned after 7 pm and at week-ends and contact him on his fixed telephone and send him emails at his private address
- A "Work" group which can see the presence of the user concerned from 9 am to 7 pm from Monday to Friday, contact him on his mobile from 9 am to 7 pm from Monday to Friday and send him emails at his professional address
- An "Anonymous" group (default group) which can send emails to the user concerned at a third email address that he consults only occasionally.

The privileges server 103 keeps in memory a log of the invitations generated, thereby allowing the user 100 to return subsequently to rights, either so as to extend/restrict the rights of access of a correspondent 102 to one of his services 104, or to revoke previously allocated rights.

The user 100 can optionally associate with an invitation coupon a personal identifier characterizing the recipient 102, so as to guarantee that only the person possessing this personal identifier will be able to access the services 104 authorized in the invitation coupon. This personal identifier can optionally be used as communication identifier for sending the invitation coupon (for example for sending an SMS when the identifier is a telephone number).

The device 101 for managing invitations sends (10) the invitation coupons to the correspondents 102 defined by the user. This sending can be done either in a systematic manner, or on request (for example when a correspondent asks the system for it). A public invitation coupon can optionally be made available (for example on a personal web page or a blog).

The device 101 generates the invitation coupons with the aid of the privileges server 103. The device 101 is responsible only for the entry and proper formatting of the data generated.

The invitation coupon may be of several types, such as for example a visiting card, that is to say a standardized data structure (for example, in the "vcard" or "hcard" format) or proprietary data structure making it possible to store and to communicate the contactability identifiers of a person or of an organizational entity (for example email address, a telephone number, fax number, an instantaneous messaging identifier, a networked game identifier, an address of a personal web site, etc.). The tokens defined hereinbelow can then be conveyed directly in this visiting card. The coupon can also take the form of a specific field of a visiting card.

The invitation coupons (and the associated tokens) received may be kept in an address book (especially if they have the form of a visiting card) or by another information storage unit.

A correspondent 102 having received an invitation coupon from the user 100 can access a service 104 proposed by the user, for example contact the user 100 by telephone or send him instantaneous messages, or access personal data of the user 100 (for example a postal address)).

To access personal data of the user, the correspondent 102 can, in a particular embodiment, provide (11) the invitation coupon received to the privileges server 103 and recover (12) the data published by the user 100 for this coupon.

In a general manner, to access a service 104 (for example to get in touch with the user), the correspondent 102 requests (11) the privileges server 103 for access to the service. During this request he provides the invitation coupon received. The privileges server 103 returns (12) a token linked to an access control policy.

This token can arrive in various forms, such as for example:
- a "token" which will allow the communication service to recover the corresponding contactability identifier (for example an email address or an SIP URI) from the privileges server 103 (case described in the Code Listing);
- a contactability identifier encrypted by the privileges server 103 with an encryption key known both to the privileges server 103 and to the service 104 of the user 100, or else directly with a public key of the service 104;
- a temporary contactability identifier ("one shot") having previously been stocked up in the service 104 by the privileges server 103;
- a URI to a web page (hosted for example by the privileges server) making it possible to execute the service 104 without the identifiers being accessible (for example "click to dial" for telephony).

An authentication of the correspondent 102 may optionally be requested, if the coupon has been defined for this purpose by the user 100.

The correspondent 102 requests (13) access to the communication service. He provides the access control policy token, certified by the privileges server 103 as specified by the user 100. This can be done in various ways, according to the form of the token as set forth hereinabove. For example:
- in the case of a "token", by way of an encrypted or one-shot (single use) contactability identifier, the terminal of the correspondent 102 directly invokes the service 104 shared by the user 100;
- in the case of a call of "click to dial" type, it is the web server designated by the URI transmitted which invokes the service 104, for example a communication service. In a particular embodiment, this web server may coincide with the privileges server 103.

The communication service 104 requests (14) the privileges server 103 for the definition of the access control policy linked to the token with which it was provided. This step is optional according to the form of the token. It will for example be omitted in the case of the single-use contactability identifier (of "one-shot" type), where the rights will have been stocked up beforehand in the service 104 by the privileges server 103.

The service 104 carries out the service for the correspondent 102 (for example by putting him in touch with the user on his personal mobile telephone, without the telephone number of the mobile having been communicated, or else by offering him personalized access to the service 104, dependent on the rights of access previously defined for him by the user 100).

A detailed description of a possible embodiment of the invention is proposed hereinbelow, on the basis of a telephony service accessible from a web page.

The sequence which follows describes an exemplary embodiment of the method applied to a telephony service with an invitation coupon delivered by a web interface. The scenario is implemented with a user UA who is seeking to filter his incoming telephone calls, and a correspondent UB who will seek to enter into communication with the user UA.

1) The user UA transmits to UB via messaging a URL intended to allow UB to enter into communication with him in a favored manner. This URL is in the format of the HTTP URLs and constitutes the invitation coupon. It comprises an enciphered datum which constitutes the privilege identifier. This enciphered datum is generated by the privileges server. The URL points in reality at the privileges server of the user UA and not at the telephone service. This invitation coupon has the following form: http://ua.invitation-orange.com/87GHT54PO0007FTY32;

2) UB wants to enter into communication with UA. He uses the abovementioned URL. The call from UB is received by the privileges server of the user UA;

3) The privileges server of UA verifies that the privilege identifier has not lapsed and obtains an XHTML document (a web page) in the "hCard" format which contains data on the user (UA), URLs for accessing data or services of the user and contactability identifiers;

4) The privileges server of the user UA provides in the "xhtml" document an "SIP URI" pointing to the agent of the network that is in charge of processing this connection request in respect of UA (for example to an SIP telephone of the user UA). The URI is opaque and consists of a token identifying the access policy "direct access" and the user UA. The URI of the example is: "sip:58346981247@sip.orange.com";

5) UB uses this SIP URI to call UA;

6) The agent of the network that receives the request invokes the privileges server to ascertain which is the access policy and the recipient of the URI that it has received ("58346981247");

7) The privileges server provides the necessary information for managing this call: authorized ring tone and return to authorized mobile, and the destination SIP URI ("sdupond1@sip.orange.com");

8) The agent of the network in charge of processing the call carries out the service as a function of the rights.

An exemplary corresponding coding is given in Code Listing section. Concerning the format of the invitation coupon, the latter can, for example, be of the type:

"Privilege://provider/token_sender/token_coupon", or else;

"http://privilege.provider/sender/token".

The token may be omitted when the recipient must be authenticated with the privileges server.

A few examples of form of token authorizing access to a service shared by a user are described hereinbelow, for at least one correspondent.

Here it is considered, by way of an illustrative and nonlimiting example, that a correspondent Bob has received an invitation coupon from a user Alice wishing to offer Bob access specific to one of her own services, for example in a community web service context.

Bob has a PC web access for a light client or web access for a client on a mobile telephone.

In the case of mobile access, the tokens are for example the following:

For the telephony service: "Call <sip:abcd@orange.fr>"

The actuation of this token launches a call from the mobile telephone to abcd@orange.fr. This URI ("Uniform Resource Identifier") is configured beforehand by the privileges server with the telephone server as having to be routed to Alice's real telephone number, optionally with particular timetable rules (for example only from 2 pm to 6 pm, otherwise messaging).

For the presence service: "Presence <pres:xyz@orange.fr>"

The actuation of this token launches a request from the presence client to xyz@orange.fr. This address is configured beforehand by the privileges server with the presence server as corresponding to the presence of Alice, with particular rules of compliance with private life (or "privacy").

For the photo service: "Photo album <http:gugus.photo.orange.fr>"

The actuation of this token launches a request from the mobile web client to http:gugus.photo.orange.fr.

In the case of a web access, the tokens are for example the following:

For the telephony service: "Call http://abcd.phone.orange.fr"

The actuation of this token launches a click to dial call to abcd@orange.fr. Bob must then enter the number of the telephone closest to him. The URI abcd@orange.fr is configured beforehand as previously.

For the presence service: "Presence http://xyz.presence.orange.fr"

The actuation of this token launches a request from the presence client (front-end web) to xyz@orange.fr. This address is configured beforehand by the privileges server as previously.

For the photo service: "Photo album <http:gugus.photo.orange.fr>"

The actuation of this token launches a request from the web client to http:gugus.photo.orange.fr.

Figure 2:
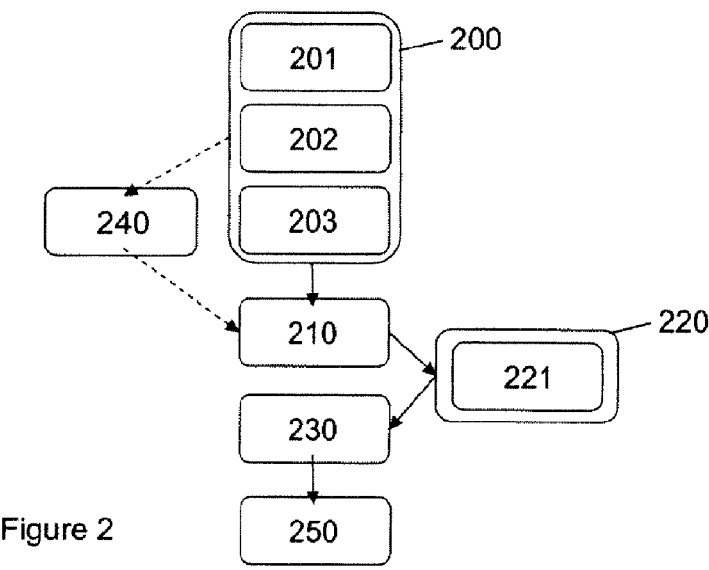
FIG. 2 is a flowchart summarizing the main steps of the method according to an embodiment of the invention.

Summarized hereinbelow in conjunction with FIG. 2 are the main steps of the method of access by at least one second user 102, to at least one service offered by a first user 100, according to an embodiment of the invention:

a step 210 of transmission by the first user 100 to the second user 102, of at least one invitation to access at least one service, this invitation comprising an access level specific to said at least one service, the access level being defined by the first user for the second user;

a step 220 of verifying the content of said at least one invitation by an access right management entity, the verification step 220 delivering to the second user 102 an authorization to access said at least one service 104 taking account of the access level;

a step 230 of requesting access to said at least one service by the second user, on the basis of the access authorization.

Prior to the transmission step 210, the method comprises a step 200 of generating by a device 101 for managing invitations at least one invitation to access said at least one service intended for at least one second user.

It also comprises a step 240 of saving by the device 101 for managing invitations at least one invitation generated in relation to at least one second user 102.

The generating step 200 comprises for each invitation generated:

a sub-step 201 of validation by an access privileges server 103 connected to the invitation management device 101, of an access level specific to the second user 102 so as to access said at least one service 104 and defined in the invitation;

a sub-step 202 of storage by the access privileges server 103 of at least one item of information representative of said at least one second user 102 and associated with at least one item of information representative of a certified level of access to said at least one service 104 for the second user 102.

In said generating step 200, an identifier of said second user 102 is associated 203 with said invitation generated.

The transmission step 210 is executed by the device 101 for managing invitations, on the basis of at least one communication identifier specific to the second user 102.

Said at least one invitation is transmitted (step 210) to the second user 102 inside a standardized data structure.

Said at least one invitation is stored in a device 105 for managing the invitations received.

The verification step 220 comprises a prior sub-step 221 of authenticating said second user 102.

The method according to an embodiment of the invention also comprises a step 250 of checking the validity of the authorization of access by said at least one service 104, with the privileges server 103.

a sub-step of storing, by said privileges server, at least one item of information representative of said at least one second user and associated with at least one item of information representative of a validated access level to allow said second user to access said service.

4. The method as claimed in claim 3, further comprising a step of checking the validity of said authorization of access by said at least one service with the aid of said privileges server.

---

Code Listing

```
<div class="vcard">
    <span class="fn n">
        <a class="url" href="http://dupond.orange.com">
            <span class="given-name">Serge</span>
            <span class="family-name">Dupond</span>
        </a>
    </span>
    <span class="nickname">S.Dupond</span>
    <a class="url" href="xmpp:58346981247@jabberorange.com">priviledge IM access to S Dupond</a>
    <a class="url" href="msnim:chat?contact=sdupond@hotmail.com">IM with s dupond@hotmail.com</a>
    <a class="url" href="sip:58346981247@sip.orange.com">Priviledge calling line </a>
    <a class="email" href="mailto:58346981247@orange.com">
        <span class="type">preferred email</span>
    </a>
    <span class="org">Orange</span>
    <span class="geo">
        <abbr class="latitude" title="48.816667">N 48° 81.6667</abbr>
        <abbr class="longitude" title="2.366667">E 2° 36.6667</abbr>
    </span>
</div>
```

---

The invention claimed is:

1. A method of access by at least one second user device, to at least one service offered by a first user, the method comprising steps of:

generating, by an invitations management device specific to said first user, at least one invitation, intended for at least one second user, to access at least one service offered by the first user, said invitation being included in a standardized data structure and comprising an access level defined by said first user to allow said at least one second user to access said at least one service;

transmitting, by said first user invitations management device, an invitation to a second user device;

producing, by said second user device, said invitation to a privileges server;

verifying, by said privileges server, content of said invitation, and returning to said second user device an access authorization token to access said at least one service, dependent on said access level; and requesting access to said at least one service by said second user device, based on said access authorization token.

2. The method as claimed in claim 1, further comprising a step of saving by said device for managing invitations said at least one invitation generated in relation to at least one second user device.

3. The method as claimed in claim 1, wherein said generating step comprises for each invitation generated in said generating step:

a sub-step of validating, by said privileges server connected to said invitation management device, an access level defined in said invitation to allow said second user to access said at least one service; and

5. The method as claimed in claim 1, wherein at said generating step, a personal identifier specific to said second user is associated with said generated invitation.

6. The method as claimed in claim 1, wherein said transmission step is executed by said device for managing invitations, while taking account of at least one communication identifier specific to said second user.

7. The method as claimed in claim 1, wherein said verification step comprises a prior sub-step of authenticating said second user.

8. The method as claimed in claim 1, wherein, in said transmission step, said invitation is transmitted by said first invitations management device specific to said first user to a second invitations management device specific to said second user.

9. The method as claimed in claim 8, further comprising, on request of modification of a previously transmitted invitation, a step of transmitting, by said first device for managing invitations to said second device for managing invitations, an update message for said previously transmitted invitation, to modify rights of access previously defined in this invitation by said first user for said second user.

10. A non-transitory computer program product stored on an information medium readable by a processor of a computer comprising code instructions for the execution on the processor of a method of access by at least one second user device, to at least one service offered by a first user, as claimed in claim 1.

11. A system for access by at least one second user device, to at least one service offered by a first user, the system comprising:

an invitation management device of said first user for transmission to said second user device, of at least one invitation capable of providing access to said at least one service, said invitation being included in a standardized data structure and comprising an access level specific to said at least one service, said access level being defined by said first user for said second user;

a transmitter in said second user device for transmission of said at least one invitation to a privileges server;

wherein the privileges server authenticates the content of said at least one invitation, and is able to deliver to said second user device an access authorization token to access said at least one service taking account of said access level; and a requestor in the second user device for requesting access to said at least one service by said second user, said requestor taking account of said access authorization token.

12. The system as claimed in claim 11, further comprising at least one device for generating invitations which is able to collaborate with said privileges server to generate at least one invitation to access said at least one service intended for at least one second user.

* * * * *